United States Patent [19]

Kolze

[11] Patent Number: 4,527,590
[45] Date of Patent: Jul. 9, 1985

[54] A.C. SOLENOID THREE WAY PILOT VALVE

[75] Inventor: Lawrence A. Kolze, Bensenville, Ill.

[73] Assignee: Eaton Corporation, Cleveland, Ohio

[21] Appl. No.: 679,110

[22] Filed: Dec. 7, 1984

Related U.S. Application Data

[63] Continuation of Ser. No. 412,480, Aug. 30, 1982, abandoned.

[51] Int. Cl.³ .......................................... F15B 13/044
[52] U.S. Cl. ........................ 137/596.17; 137/625.65; 137/870; 251/138
[58] Field of Search .................. 137/596.17, 625.65, 137/870; 251/138

[56] References Cited

U.S. PATENT DOCUMENTS

| | | | |
|---|---|---|---|
| 2,314,860 | 3/1943 | Lenin | 137/596.17 X |
| 2,336,887 | 12/1943 | Piron | 137/596.17 X |
| 2,398,452 | 4/1946 | Shaw | 137/596.17 X |
| 2,469,757 | 5/1949 | Watson | 137/625.2 |
| 2,700,374 | 1/1955 | Jacobsen | 137/596.17 X |
| 2,750,960 | 6/1956 | Hansen et al. | 137/870 X |
| 2,899,972 | 8/1959 | Matthews | 251/30 X |
| 3,242,945 | 3/1966 | Nash | 137/596.17 |
| 3,263,693 | 8/1966 | Ages | 137/625.2 X |
| 3,294,290 | 12/1966 | Erickson et al. | |
| 3,423,062 | 1/1969 | Grayson | 251/30 |
| 3,470,911 | 10/1969 | Dunn | 137/625.64 |
| 3,683,962 | 8/1972 | Good | 137/870 X |
| 3,796,229 | 3/1974 | Wright | 251/30 X |
| 3,982,562 | 9/1976 | Pickett | 137/870 X |
| 3,991,788 | 11/1976 | Kull | 137/870 X |
| 4,076,046 | 2/1978 | Hieronymus et al. | 137/596.17 X |
| 4,205,593 | 6/1980 | Sakakibara | 137/625.65 X |
| 4,249,457 | 2/1981 | Sakakibara | 137/625.65 X |
| 4,250,924 | 2/1981 | Sakakibara et al. | 137/596.17 X |
| 4,285,497 | 8/1981 | Guttel | 137/625.65 X |
| 4,313,366 | 2/1982 | Inada et al. | 137/625.65 X |
| 4,469,134 | 9/1984 | Kanai et al. | 137/596.17 X |

Primary Examiner—Gerald A. Michalsky
Attorney, Agent, or Firm—C. H. Grace; R. A. Johnston

[57] ABSTRACT

A solenoid operated valve having a single inlet and dual outlets. A lever means is pivotally disposed in a valving chamber and is provided with poppet means which upon movement of the lever alternately closes one outlet while the other outlet remains open. An external solenoid coil moves an armature disposed in said chamber which effects lever movement. One embodiment employs separate spaced poppets for each outlet and another embodiment employs a single poppet with opposing sealing faces for each outlet. Spring means biases said lever means against said armature means.

4 Claims, 4 Drawing Figures

A.C. SOLENOID THREE WAY PILOT VALVE

BACKGROUND OF THE INVENTION

The present invention relates to magnetically actuated fluid valves. In particular, the invention relates to solenoid actuated valves for use with systems employing fluid powered actuators as, for example, hydraulic or pneumatic power cylinders. More paticularly, the invention relates to electromagnetically actuated valves employing a solenoid for moving the fluid valving member.

Solenoid actuated valves are employed where the fast action of the valving member is required and where remote actuation is desired. For example, it is known to employ pilot-operated solenoid actuated valves for water inlet to washing appliances. Valves for applications of this type are known to employ a solenoid having a coil wound of many turns of fine wire which provides a low force output on the armature from a small coil yet produces rapid actuation. In such low power pilot-operated valves it is known to provide an armature disposed in the valving chamber and electromagnetic field from the exterior of the valving chamber. However, where it is desired to provide direct valve actuation, e.g., without a pilot operator, it has been difficult to find a way or means for actuating the valving member externally with sufficient force without providing for penetration of the valving chamber by linkages or other force actuator mechanisms.

It has therefore been desired to provide a solenoid operated valve with a sealed valving chamber for direct valving actuation by energization of an external solenoid coil. It has further been desired to provide such a sealed direct actuated valve having a compact solenoid low in manufacturing cost and requiring relatively very low electrical power consumption.

SUMMARY OF THE INVENTION

The present invention provides a solution to the above described problem in that the valve of the present invention employs a valving member disposed in a fluid pressure sealed chamber and actuated by an externally disposed magnetomotive force means. The valving member is direct actuated by a movable armature disposed in the sealed chamber and actuated by a coil disposed externally of the fluid valving chamber. The valve of the present invention provides for, on actuation of the magnetomotive force means, direct actuation of the valving member with a minimum of force required.

The valve of the present invention employs a lever disposed for pivotal movement within the chamber and having valving poppets disposed thereon. The solenoid armature is disposed to contact the lever in a manner providing a mechanical advantage about the fulcrum or pivot to enable a relatively small magnetomotive force from the energized coil to control actuation against the forces of the return bias spring acting on the poppet and armature.

The present invention thus provides a low cost valve having a valving member disposed in the fluid valving chamber and moved for valving action by direct actuation from the armature of an electromagnetic solenoid. The present invention further provides a quick-acting, remotely actuated electromagnetic valve having a sealed valving chamber and valve mechanism for providing rapid actuation with a minimum power consumption.

DETAILED DESCRIPTION OF THE DRAWINGS

Figure 1:
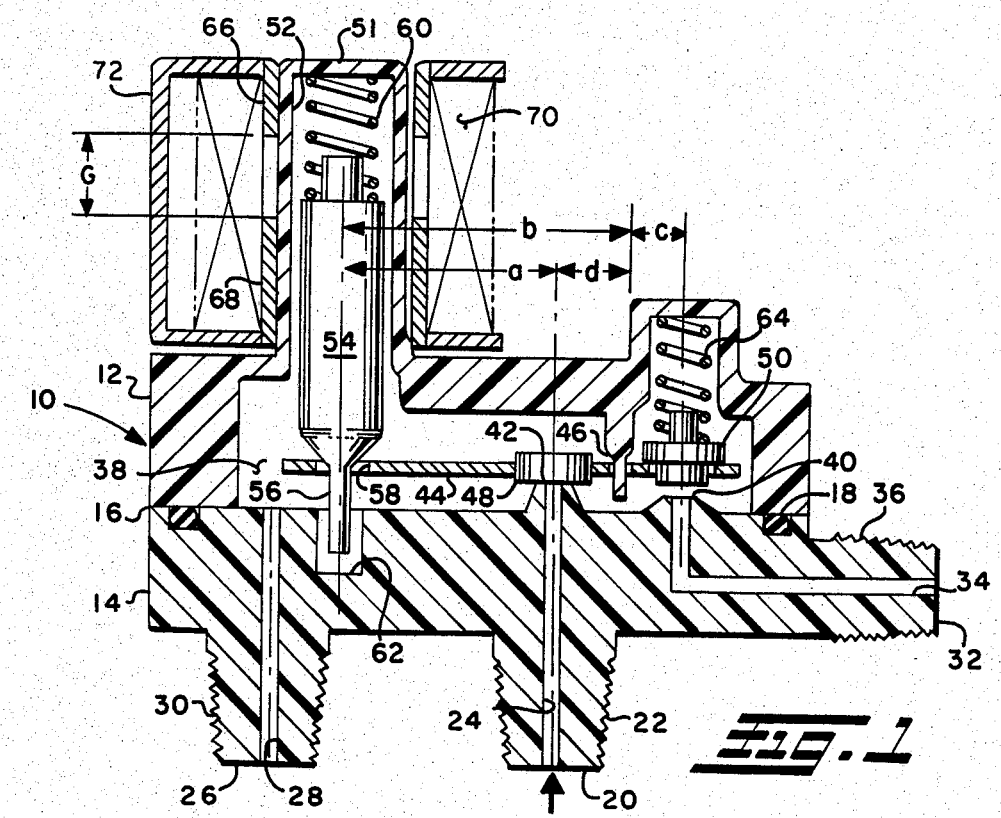
FIG. 1 is a crosssection in side elevation of the valve of the present invention illustrated in the unactivated position.

Referring now to FIG. 1, the valve assembly indicated generally at 10 is illustrated as having a body formed of an upper shell 12 and lower shell 14, joined along a parting line 16. The upper and lower body shells are sealed at the parting line by a suitable expedient as, for example, O-ring 18 and retained together by any convenient fastening means as, for example, screws or clips (not shown). Alternatively, the upper and lower housing shell may be sealed together by a suitable weldment, in which case the O-ring may be omitted.

In the embodiment of FIG. 1 the lower housing shell 14 has provided thereon an inlet fitting 20 adapted for fluid conduit attachment thereto by engagement with threads 22. An inlet passage 24 is provided through the fitting 20.

A first outlet fitting 26 is provided on the lower housing shell 14, in spaced relationship from inlet fitting 20, and with exterior threads 30 adapted for conduit engagement thereto. Outlet fitting 26 has an outlet passage 28 provided therein. A second outlet fitting 32 is provided on the right end of housing shell 14 and has a fluid passage 34 therethrough and external attachment threads 36 provided thereon.

The upper and lower housing shells 12, 14 cooperate to define a valving chamber 38. Outlet passage 34 is ported to chamber 38 in the form of an annular valve seat 40; and, similarly, inlet passage 24 is ported to the chamber 38 in the form of an annular valve seat 42. Outlet passage 28 communicates directly with chamber 38.

Figure 2:
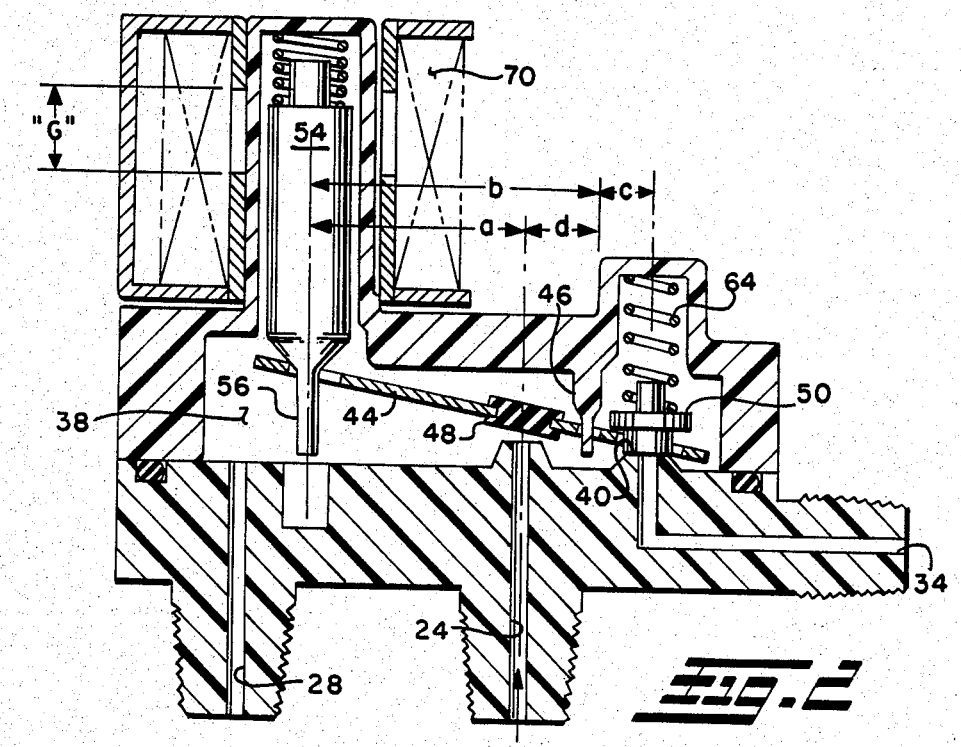
FIG. 2 is a view of the embodiment of FIG. 1 in the valve actuated position.

Referring to FIGS. 1 and 2, a lever member 44 is disposed within the chamber 38 and mounted for pivotal movement about a fulcrum 46 provided on the upper housing shell 12 at the inner wall of chamber 38. Lever arm 44 has an inlet valve poppet 48 mounted on the lever arm in a position so as to contact the inlet valve seat 42 as shown in FIG. 1. An outlet valve poppet 50 is disposed adjacent the right hand end of arm 44 and positioned for contacting the outlet valve seat 40 as shown in FIG. 2. The lever 44 is pivoted at a point therealong intermediate the poppets 48, 50 about fulcrum 46.

The upper body shell 12 has an elongated extension portion 51 having formed therein a guide bore 52 with a movable ferromagnetic armature 54 slidably received therein. Armature 54 has a pilot portion 56 depending from the lower end thereof, which pilot portion extends through an aperture 58 disposed adjacent the left end of lever arm 44. The upper end of armature 54 has one end of a compression spring 60 registered thereover with the upper end of the spring engaging the undersurface of armature guide portion 51. In the currently preferred practice, the lower body shell 14 has a clearance recess 62 provided therein for permitting vertical movement of the armature without contact of the armature pilot 56 with the lower body shell 14.

Armature 54 is biased by spring 60 in a vertically downward direction to register against the lever arm 44 and thereby urge inlet poppet 48 into contact with valve seat 42 for closing the inlet passage 24 from communication with the chamber 38.

Referring to FIG. 1, a second compression spring 64 having the lower end thereof registered against outlet poppet 50 and the upper end thereof engaging the inner wall of chamber 38 urges poppet 50 in a downward direction against lever arm 44. Springs 60 and 64 thus cooperate to urge the lever arm to the position shown in FIG. 1 whereby poppet 48 closes contact seat 42 and closes passage 24.

A pair of axially spaced tubular pole pieces 66, 68 are received over the upper shell guide portion 51 in axially spaced arrangement to define an air gap indicated by the letter "G" in FIG. 1. A coil 70 of magnet wire is disposed about the pole pieces 66, 68 and is adapted for attaching to a suitable source of electrical power (not shown) for energization. A pole frame 72 is received over the upper and lower pole pieces 66, 68 to complete a ferromagnetic flux loop through the pole pieces about the coil 70.

Upon energization of the coil 70, the armature 54 seeks a null position with respect to the poles forming air gap "G" and is moved vertically upward to the position in shown in FIG. 2.

With the armature 54 in the position shown in FIG. 2, spring 64 urges poppet 50 and the right end of lever 44 in a downward direction until the lower surface of poppet 50 contacts the valve seat 40, pivoting lever 44 about the fulcrum 46, thereby raising the inlet poppet 48 from the valve seat 42 and communicating the inlet passage 24 with the valving chamber 38. The valve in the energized condition as illustrated in FIG. 2 thus permits fluid communication between inlet port 24 and the outlet port 28 and blocks communication between the inlet port 24 and the outlet passage 34.

Figure 3:
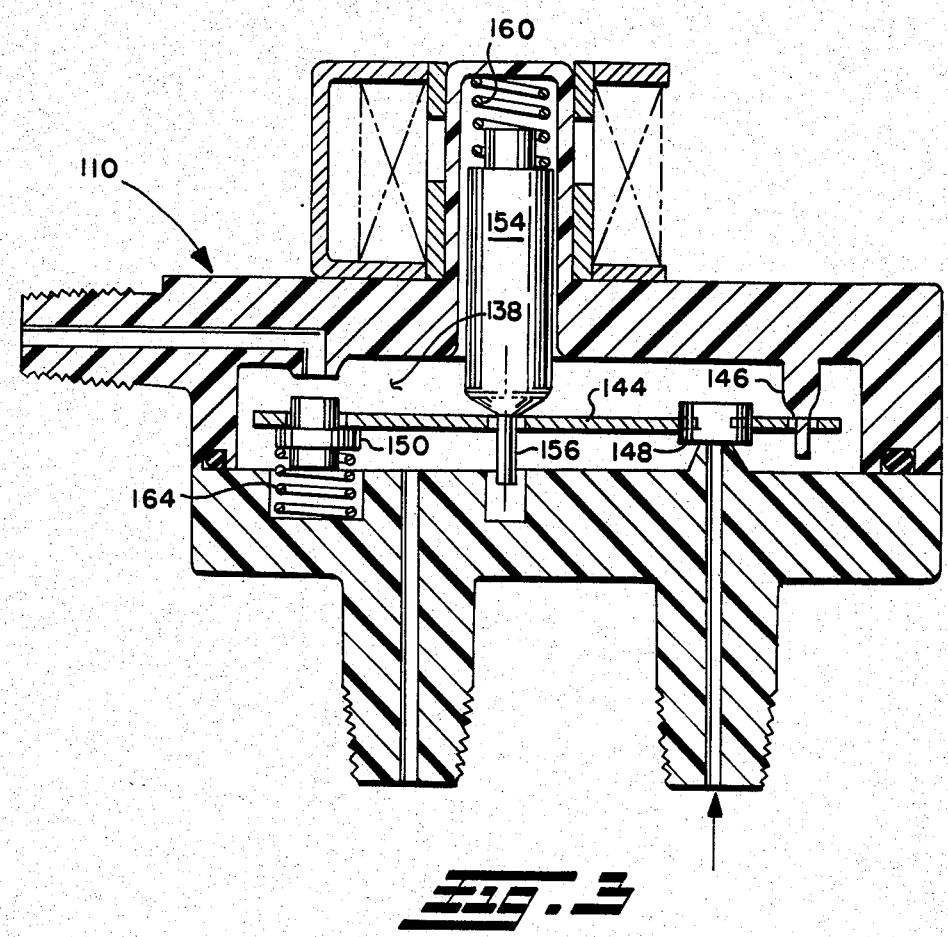
FIG. 3 is a view similar to FIG. 1 of an alternate embodiment of the invention.

Referring now to FIG. 3, an alternate embodiment of the invention indicated generally at 110 is shown, wherein the valving lever 144 has the fulcrum 146 disposed adjacent the right hand end thereof. The inlet poppet 148 is disposed adjacent the fulcrum 146 and outlet poppet 150 is disposed adjacent the left end of the lever arm 144. The armature 154 is located intermediate the inlet poppet 148 and outlet poppet 150. The arrangement of the valve lever arm 144 fulcrum in the embodiment of FIG. 3 provides for amplified movement of the outlet poppet 150, but requires somewhat greater force bias from armature return spring 161 in order to overcome the bias of the outlet poppet return spring 160.

Figure 4:
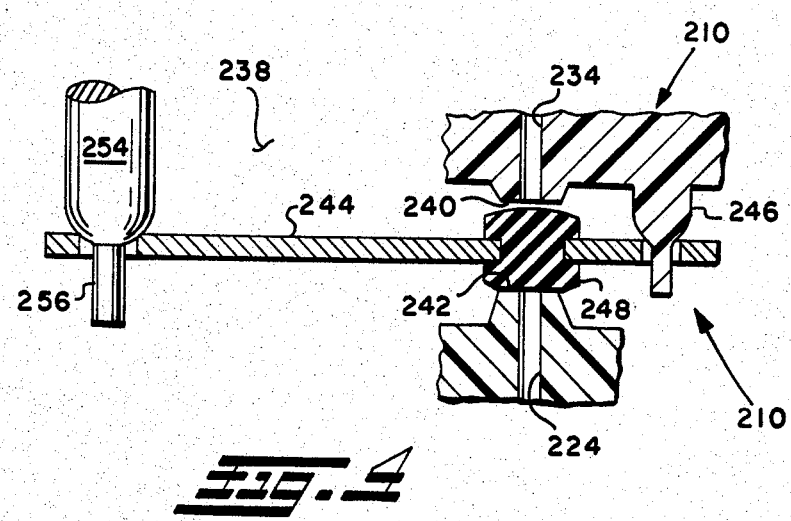
FIG. 4 is a partial crosssectional view of another embodiment of the invention.

Referring now to FIG. 4, a portion of an alternate actuation mechanism for another embodiment indicated generally at 210 of the invention is illustrated wherein the valve lever 244 is pivoted about a fulcrum 246 disposed adjacent the right hand end of the lever. The armature 254 contacts the lever adjacent the left end thereof and preferably with an armature pilot 256 received therethrough as in the embodiments of FIGS. 1 and 3.

With continued reference to FIG. 4, an inlet valve seat 242 is disposed on one side of the lever 244 at a station adjacent the fulcrum 246 and intermediate the fulcrum and armature 254. An inlet valve seat 242 communicates the inlet passage 224 with the valving chamber 238.

An outlet valve seat 240 is disposed on the side of lever 244 opposite inlet seat 242 and at the same longitudinal station along the lever 244. Outlet valve seat 240 communicates outlet passage 234 with the valving chamber 238. It will be understood that a suitable coil of magnet wire (not shown) and ferromagnetic pole structure (not shown) is provided for actuating armature 254.

Upon energization of the coil and movement of the armature in a vertically upward direction, valve poppet 248 is moved upwardly away from valve seat 242 thereby opening communication between inlet passage 224 and chamber 238 and in the armature-actuated condition, poppet 248 contacts valve seat 240 closing communication between passage 234 and chamber 238. The movement of poppet 248 in the embodiment of FIG. 4 is thus analagous to that of a single-pole double-throw electrical switch.

The present invention thus provides an electromagnetically actuated valve in which the movable valving members are employed in a fluid pressure sealed chamber and the magnetomotive force means is disposed externally thereof. The valve of the present invention employs a ferromagnetic armature in contact with a lever member for direct actuation of the valve poppets. By virtue of a lever arrangement, a low-force armature return spring is employed such that only a low current is required for energization of the coil to overcome the armature spring, cause movement of the armature and direct actuation of the valve.

Although the invention has been illustrated and described hereinabove with respect to the presently preferred practice, it will be understood by those skilled in the art that modifications and variations may be made to the described embodiments and the invention is limited only by the following claims.

I claim:

1. A single-pole double-throw valve comprising:
 (a) body means defining a fluid pressure valving chamber having a single inlet and plural outlet ports and a valve seat disposed about said inlet and one of said outlet ports;
 (b) elongated lever means disposed in said chamber mounted on said body means for pivotal movement about a fulcrum disposed in said chamber adjacent one end of said lever means with said inlet valve seat intermediate said fulcrum and said one outlet valve seat, said lever means including poppet means adjacent each of said inlet and said one outlet valve seats and moveable between a first position closing said inlet valve seat leaving said one outlet valve seat open, and a second position opening said inlet and closing said one outlet;
 (c) means biasing said lever means about said fulcrum in a direction to close said one outlet valve seat;
 (d) armature means disposed in said chamber for movement between an extended position and a retracted position, said armature means operative in said extended position to contact said lever means intermediate said inlet and said one outlet valve seats and operative to limit movement of said lever means under the urging of said lever bias means;
 (e) means biasing said armature means to the extended position;
 (f) magnetomotive force means including magnetic pole means and operative upon actuation to overcome said armature bias means and to effect movement of said armature means from said extended position to said retracted position wherein said poppet adjacent said one valve seat is moved a greater distance when said poppet adjacent said inlet valve seat.

2. The valve defined in claim 1, wherein said magnetomotive force means comprises an electromagnet having a coil with a pair of axially spaced tubular pole pieces disposed within said coil.

3. The valve defined in claim 1, wherein said magnetomotive force means includes a coil having a portion of said housing means defining said valving chamber received therein.

4. The valve defined in claim 1, wherein said magnetomotive force means includes a coil with a portion of said body means defining said chamber disposed within said coil with said armature received in said portion.

* * * * *